US008649496B2

(12) United States Patent
Dwight et al.

(10) Patent No.: US 8,649,496 B2
(45) Date of Patent: Feb. 11, 2014

(54) CALL CLASSIFICATION AND FORWARDING

(75) Inventors: Timothy M. Dwight, Richardson, TX (US); Paul Schneeloch, Gettysburg, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 974 days.

(21) Appl. No.: 12/636,812

(22) Filed: Dec. 14, 2009

(65) Prior Publication Data
US 2011/0142224 A1 Jun. 16, 2011

(51) Int. Cl.
*H04M 7/00* (2006.01)
(52) U.S. Cl.
USPC .................................. 379/220.01; 379/201.01
(58) Field of Classification Search
USPC .................. 379/220.01, 201.01, 201.02, 219, 379/221.14; 370/352
See application file for complete search history.

(56) References Cited

U.S. PATENT DOCUMENTS

| 6,873,849 | B2 * | 3/2005 | de la Red et al. ............. 455/445 |
| 7,248,682 | B1 * | 7/2007 | Oran ........................ 370/395.52 |
| 7,764,955 | B1 * | 7/2010 | Mangal et al. ................ 455/417 |
| 2005/0286531 | A1 * | 12/2005 | Tuohino et al. ............ 370/395.2 |
| 2007/0127492 | A1 * | 6/2007 | Wellington et al. ........ 370/395.3 |
| 2009/0144397 | A1 * | 6/2009 | Westman et al. ............. 709/219 |
| 2010/0036915 | A1 * | 2/2010 | Kim et al. ..................... 709/206 |
| 2010/0040048 | A1 * | 2/2010 | Vormisto ..................... 370/352 |
| 2010/0074431 | A1 * | 3/2010 | Enzmann et al. ........ 379/221.13 |
| 2010/0250680 | A1 * | 9/2010 | Bhatt et al. .................. 709/206 |
| 2011/0211684 | A1 * | 9/2011 | Wu et al. ................. 379/201.02 |
| 2012/0287857 | A1 * | 11/2012 | Ku ............................... 370/328 |

* cited by examiner

*Primary Examiner* — William Deane, Jr.

(57) ABSTRACT

A method may include receiving a telephone number mapping query from a querying device, the telephone number mapping query being associated with a call from a calling party to a called party. The method may also include retrieving address information based on the telephone number mapping query, the address information including addresses associated a number of network devices. The method may further include retrieving call type information associated with each of the addresses, and forwarding the address information and the call type information to the querying device.

19 Claims, 6 Drawing Sheets

CALL CLASSIFICATION AND FORWARDING

BACKGROUND INFORMATION

Routing calls through networks has become increasingly complex. For example, when terminating calls to the public switched telephone network (PSTN), voice over Internet protocol (VoIP) systems must follow regulations that govern how the calls are terminated. These regulations classify calls based on the geographic relationship of called and calling parties and facilitate determining whether the terminating carrier is due any compensation with respect to the call.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to terminating calls between carrier networks, such as between a VoIP-based network/system and the PSTN. In one implementation, a call processing device in a VoIP system may identify a call type based on the called and calling telephone numbers. The call processing device may also query a telephone number mapping server/database to identify an element to which the call will be forwarded. The telephone number mapping server may provide a number of addresses corresponding to different network elements that will handle different types of calls that terminate to the PSTN. When the response to the query is received, the querying device may select the appropriate address based on the identified call type and forward the call to the appropriate network element.

Figure 1:
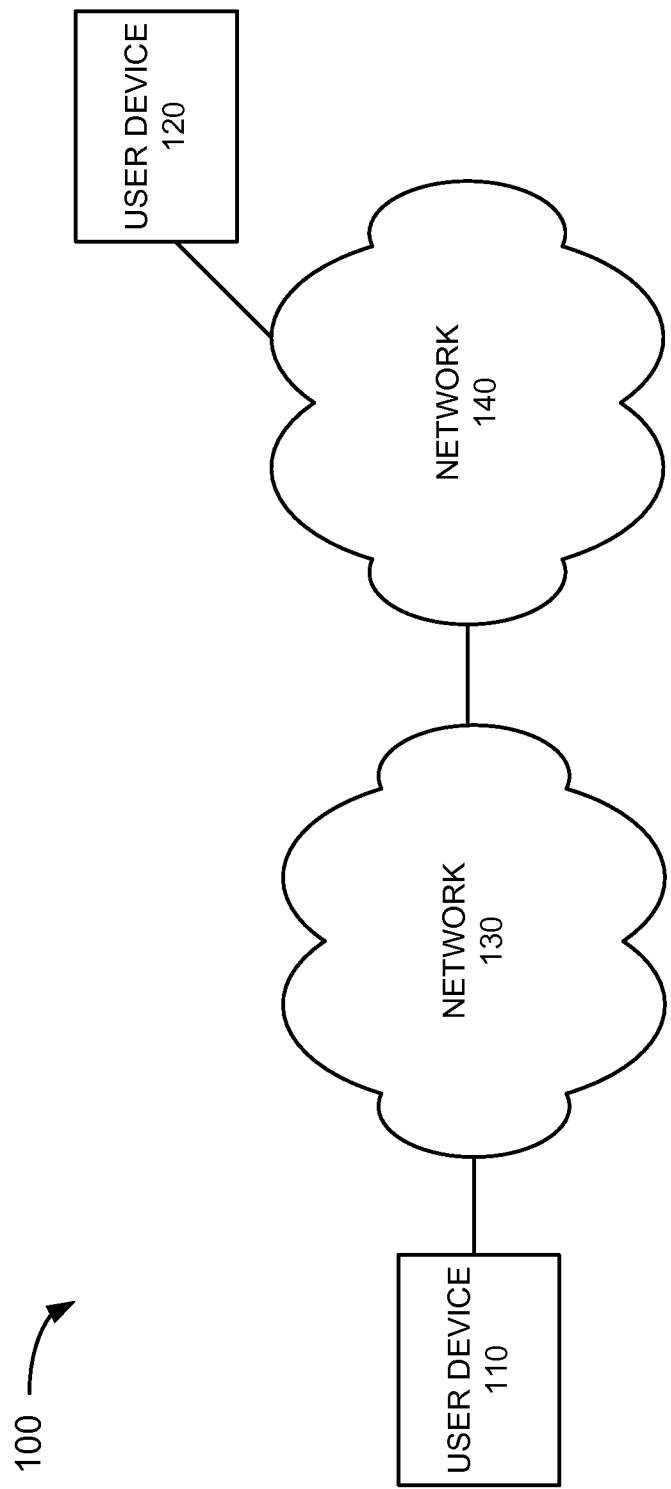
FIG. 1 illustrates an exemplary network in which systems and methods described herein may be implemented.

FIG. 1 is a block diagram of an exemplary network 100 in which systems and methods described herein may be implemented. Network 100 may include user device 110, user device 120, network 130 and network 140.

User devices 110 and 120 may each include any type of device that is able to transmit and receive data, such as text data, video data, image data, audio data, multi-media data, etc. For example, user devices 110 and 120 may each include some type of computer, such as a personal computer (PC), a laptop computer, etc., a personal digital assistant (PDA), a web-based appliance, a mobile terminal (e.g., a cellular telephone), etc. User devices 110 and 120 may also each include a telephone, such as a PSTN based telephone, an Internet-protocol (IP) based telephone, a wireless telephone, etc., used to make and receive telephone calls.

Networks 130 and 140 may each include one or more wired, wireless and/or optical networks that are capable of receiving and transmitting data, voice and/or video signals, including multi-media signals that include voice, data and video information. For example, network 130 and network 140 may each include one or more PSTNs or other type of switched network. Network 130 and/or network 140 may also include one or more wireless networks and may include a number of transmission towers for receiving wireless signals and forwarding the wireless signals toward the intended destinations. Network 130 and/or network 140 may further include one or more satellite networks, one or more packet switched networks, such as an IP-based network, a local area network (LAN), a wide area network (WAN), a personal area network (PAN) (e.g., a wireless PAN), an intranet, the Internet, or another type of network that is capable of transmitting data.

In an exemplary implementation, network 130 may represent a network associated with a service provider that provides various services, such as Internet-protocol (IP) related services, value added services, etc. For example, in one implementation, network 130 may represent an Internet Protocol Multimedia Subsystem (IMS) network that provides services to IMS subscribers (referred to herein as subscribers) and network 140 may represent any network or portion of a network that is not affiliated with the service provider associated with network 130. For example, network 140 may represent the PSTN.

The exemplary configuration illustrated in FIG. 1 is provided for simplicity. It should be understood that a typical network may include more or fewer devices than illustrated in FIG. 1. For example, two user devices 110 and 120 and two networks 130 and 140 are shown for simplicity. It should be understood that network 100 may include a large number (e.g., hundreds or thousands) of user devices and a number of other networks. Network 100 may also include additional elements, such as switches, routers, gateways, backend systems, etc., that aid in routing calls and/or information in network 100 and providing services to parties associated with user devices 110/120.

Figure 2:
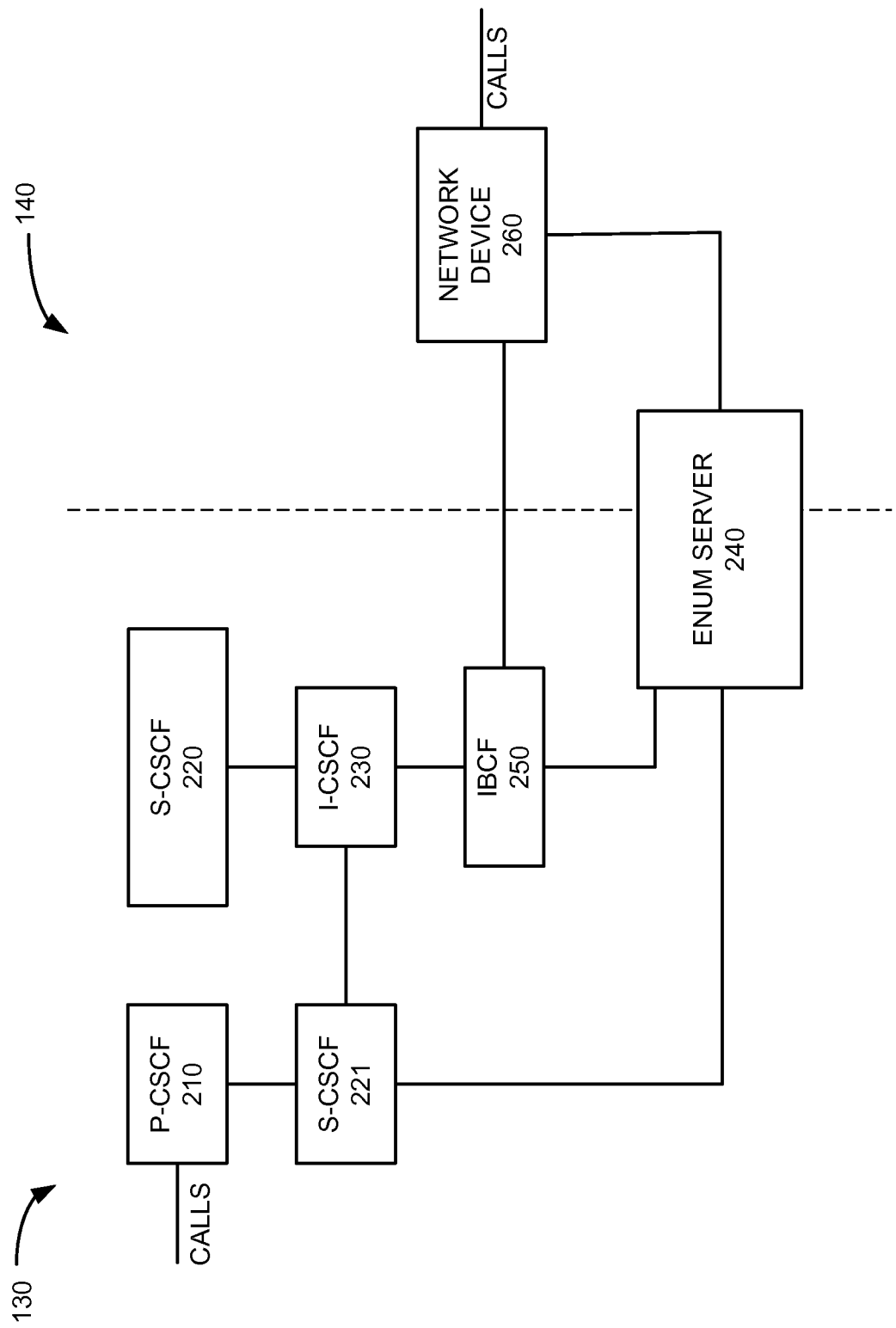
FIG. 2 illustrates exemplary components included in the network of FIG. 1.

FIG. 2 illustrates a portion of networks 130 and 140 consistent with implementations described herein. As described above, in an exemplary implementation, network 130 may include an IMS network that provides mobile and fixed users with multimedia services. For example, the IMS may provide VoIP related processing of calls for VoIP users, such as a caller at user device 110. Referring to FIG. 2, networks 130 and 140 are shown separated by the dotted line.

Network 130 may include call session control components used to process calls in network 130 (e.g., calls to/from IMS subscribers). For example, network 130 may include proxy call session control function (P-CSCF) 210, serving call session control function (S-CSCF) 220, S-CSCF 221 and interrogating call session control function (I-CSCF) 230. Network 130 may also include ENUM server 240 and interconnect border control function (IBCF) 250. It should be understood that network 130 may include additional elements that aid in routing calls and providing services to customers. In addition, functions described as being performed by one of the elements in FIG. 2 may alternatively be performed by another element or multiple elements. In addition, although the various devices illustrated in FIG. 2 are shown as separate devices, in other implementations, the functions performed by two or more of these devices may be performed by a single device or platform. Still further, additional connections (not shown) between the components of FIG. 2 may exist. For example, S-CSCFs 220 and 221 may connect to network device 260 for routing calls that terminate to the PSTN.

P-CSCF 210, S-CSCF 220, S-CSCF 221 and I-CSCF 230 may perform session control processing and may be responsible for parsing a session (e.g., a session initiation protocol (SIP) session) and applying logic (e.g., business logic, service logic, operational logic, etc.) on a per call or per event basis. The outcome of the session control processing may be to route call data to the appropriate components and/or append SIP headers and values to the call data.

In an exemplary implementation, P-CSCF 210, S-CSCF 220, S-CSCF 221 and I-CSCF 230 may be implemented in a single device. Alternatively, P-CSCF 210, S-CSCFs 220 and 221 and I-CSCF 230 may be implemented using separate network elements/devices. In one implementation, S-CSCFs 220 and 221 may be viewed as the brain of the call session control components (i.e., P-CSCF 210, S-CSCFs 220 and 221 and I-CSCF 230). The call session control components may also interact with a home subscriber server (HSS) (not shown) and/or other elements associated with providing IMS related services.

P-CSCF 210 may act as the main point of contact for connections to subscribers of the IMS (referred to herein as subscribers or IMS subscribers). For example, P-CSCF 210 may validate requests from subscribers, forward the requests to selected destinations, process and forward the responses, etc. P-CSCF 210 may also generate chargeable events and send information relating to the chargeable events to billing system (not shown).

S-CSCFs 220 and 221 may perform session control and registration services for the users of the IMS network/platform (e.g., network 130). S-CSCF 220 and/or S-CSCF 221 may receive a user profile from another device, such as a home subscriber server (HSS) (not shown in FIG. 2) and route sessions requested by a subscriber. Additionally, S-CSCF 220 and/or S-CSCF 221 may perform user authentication for subscribers.

I-CSCF 230 may act as the main point of contact for connections to subscribers served by other networks, such as other IP networks or PSTN networks (e.g., network 140). In an exemplary implementation, I-CSCF 230 may receive SIP messages and identify the next hops for the SIP messages. To accomplish this, I-CSCF 230 may query an HSS for the location (e.g., an address) of the appropriate S-CSCF to which a particular SIP message is to be forwarded. For example, the HSS may include one or more servers that act as the central repository for user-related information. I-CSCF 230 may access the HSS to identify the location of a particular S-CSCF 220/221 for a particular user.

ENUM server 240 may perform processing associated with performing E.164 number mapping (ENUM), such as mapping a called telephone number to one or more naming authority pointer (NAPTR) records. E.164 is an International Telecommunication Union telecommunication (ITU-T) standard that defines the international public telecommunication numbering plan used in the PSTN and other data networks. Each NAPTR record may specify a service (e.g., email, short message service (SMS), etc.) and the address of the network device (e.g., server) that provides the service for the associated telephone number. Such services may be referred to herein as ENUM services. In an exemplary implementation, the service provider associated with network 130 may consider PSTN termination of a call to be an ENUM service.

In some instances, the address of the network device associated with an ENUM service may correspond to a softswitch or a media gateway control function (MGCF) (e.g., an IMS MGCF). In other implementations, when the ENUM service is associated with terminating a call to the PSTN, ENUM server 240 may store information identifying addresses associated with network devices that will handle the call based on the type of call.

For example, ENUM server 240 may store information identifying various call types, such as local calls, inter local access and transport area (inter-LATA) long distance calls, intra-LATA long distance calls, international calls, etc., along with addresses of network devices configured to handle these types of calls, as described in more detail below. ENUM server 240 is also shown in FIG. 2 as straddling the line between networks 130 and 140 since ENUM server 240 is directly accessible to devices in both networks 130 and 140. However, in an exemplary implementation, ENUM server 240 may be part of network 130.

IBCF 250 may represent one or more session border controllers (SBCs) that provide control of the boundary between different service provider networks, such as networks 130 and 140. In an exemplary implementation, IBCF 250 may provide signaling protocol inter-working between an IP-based (e.g., SIP-based) platform associated with network 130 and other service provider networks (e.g., network 140), as well as control the transport boundary between service provider networks. For example, IBCF 250 may provide SIP-aware firewall capabilities that support network address translation (NAT), prevent denial of service (DoS) attacks, and execute other security enforcement and/or control features, as described in more detail below.

Network device 260 may be included in network 140 and may represent any network device that may be associated with forwarding calls in network 140 to reach the intended destination identified by the called telephone number. For example, network device 260 may represent a gateway or other network device that interfaces with a class 5 switch, a class 3 switch, a trunk group or other network device in network 140 to which calls that terminate in the PSTN will be forwarded, as described in more detail below. Although only one network device 260 is illustrated in FIG. 2, in an exemplary implementation, network 140 may include a number of different network devices that are configured to handle different types of calls. That is, network device 260 may be designed to handle local calls that terminate to the PSTN, while other network devices are designed to handle inter-LATA long distance calls, intra-LATA long distance calls, international calls, etc.

Figure 3:
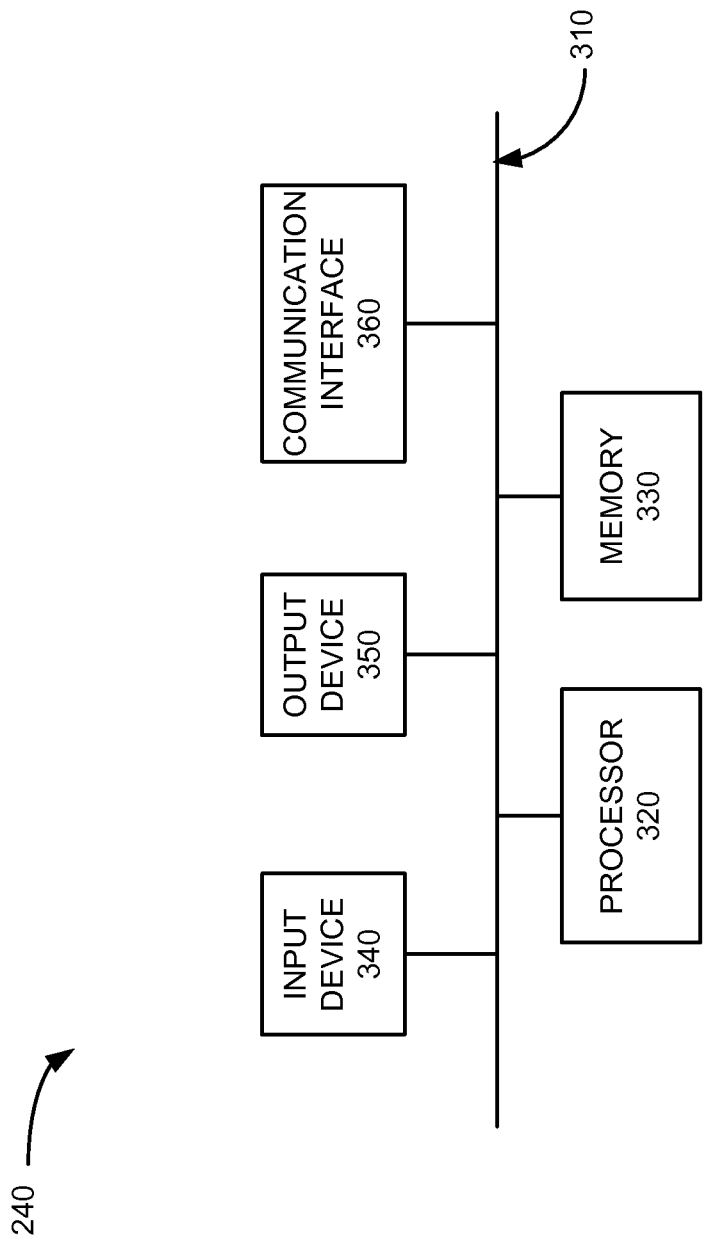
FIG. 3 illustrates an exemplary configuration of one or more of the components of FIG. 2.

FIG. 3 illustrates an exemplary configuration of ENUM server 240. Other devices in network 100, such as I-CSCF 230, IBCF 250 and network device 260, may be configured in a similar manner. Referring to FIG. 3, ENUM server 240 may include bus 310, processor 320, memory 330, input device 340, output device 350 and communication interface 360. Bus 310 may include a path that permits communication among the elements of ENUM server 240.

Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SDD). Memory 330 may also include a magnetic and/or optical recording medium (e.g., a hard disk) and its corresponding drive.

Input device 340 may include a mechanism that permits a user to input information to ENUM server 240, such as a keyboard, a keypad, a mouse, a pen, a microphone, a touch screen, voice recognition and/or biometric mechanisms, etc.

Output device 350 may include a mechanism that outputs information to the user, including a display, a printer, a speaker, etc.

Communication interface 360 may include one or more transceivers that ENUM server 240 may use to communicate with other devices (e.g., S-CSCF 22/221, I-CSCF 230, IBCF 250, network device 260, etc.) via wired, wireless or optical mechanisms. Communication interface 360 may also include one or more radio frequency (RF) transmitters, receivers and/ or transceivers and one or more antennas for transmitting and receiving RF data via network 130 and/or 140. Communication interface 360 may also include a modem or an Ethernet interface to a LAN or other mechanisms for communicating with elements in a network, such as network 140 or another network (e.g., network 130).

The exemplary configuration illustrated in FIG. 3 is provided for simplicity. It should be understood that ENUM server 240 (and I-CSCF 230, IBCF 250, network device 260) may include more or fewer devices than illustrated in FIG. 3. In an exemplary implementation, ENUM server 240 may perform operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), SSD, etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

Figure 4:
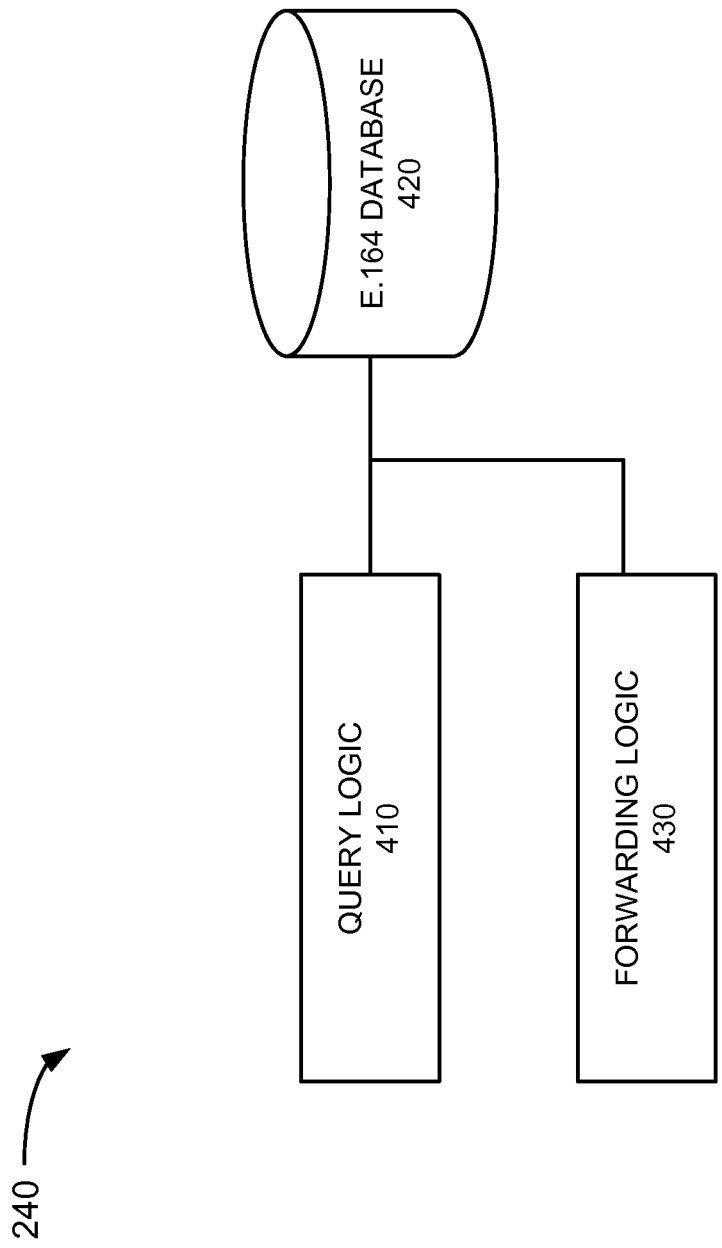
FIG. 4 illustrates an exemplary configuration of logic components implemented in the device of FIG. 3.

FIG. 4 is an exemplary functional block diagram of ENUM server 240 according to an exemplary implementation. The logical blocks illustrated in FIG. 4 may be implemented in software, hardware, or a combination of hardware and software. For example, in one implementation, all or some of the logical blocks illustrated in FIG. 4 may be implemented by processor 320 (FIG. 3) executing software instructions stored in, for example, memory 330.

Referring to FIG. 4, ENUM server may include query logic 410, E.164 database 420 and forwarding logic 430. Query logic 410 may receive queries from various devices, such as S-CSCF 221, IBCF 250, or a soft switch that resides on the same network as ENUM server 240. Each of these querying devices may request routing information associated with a called party telephone number so that the querying device may forward the call to the next hop toward the intended destination. Query logic 410 may access E.164 database 420 and provide, for example, an address identifying a network element (e.g., a gateway, a server, etc.) to which a call intended for a particular called number should be forwarded, such as a call destined for termination via the PSTN.

E.164 database 420, as described above, may store addresses associated with various call types, such as local calls, inter-LATA long distance calls, intra-LATA long distance calls, international calls, etc. In an exemplary implementation, E.164 database 420 may define separate ENUM services for each call type.

Figure 5:
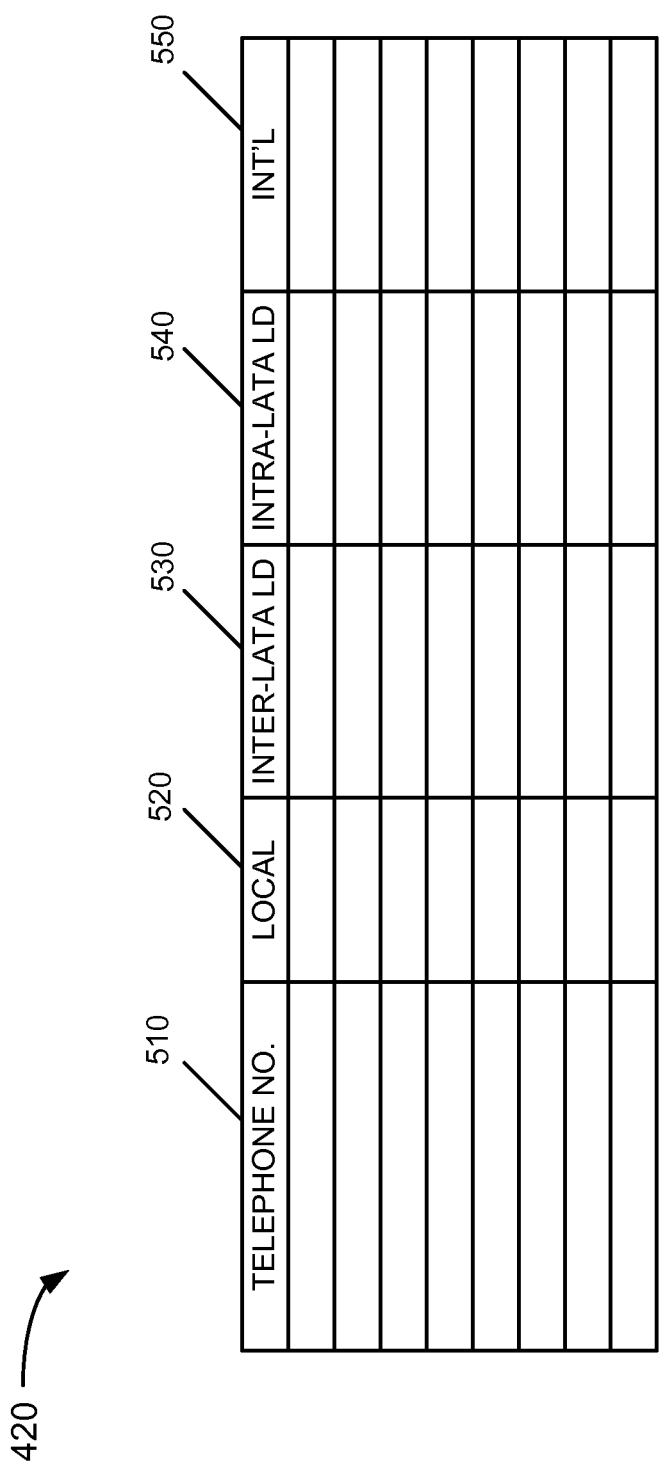
FIG. 5 illustrates an exemplary configuration of fields included in the database of FIG. 4.

FIG. 5 illustrates a portion of E.164 database 420. Referring to FIG. 5, E.164 database 420 may include telephone number field 510, local call field 520, inter-LATA long distance call field 530, intra-LATA long distance call field 540 and international call field 550. It should be understood that E.164 database may include additional fields (not shown).

Fields 520, 530, 540 and 550 may store information identifying the call type and an address associated with terminating the call type for the telephone number in field 510. For example, field 520 in one of the entries in E.164 database 420 may store a NAPTR record for a local call destined for the called party associated with the telephone number in field 510. Similarly, field 530 may store a NAPTR record for an inter-LATA long distance call destined for the called party associated with the telephone number in field 510, field 540 may store a NAPTR record for an intra-LATA long distance call destined for the called party associated with the telephone number in field 510, and field 550 may store a NAPTR record for an international call destined for the called party associated with the telephone number in field 510. Each of the NAPTR records in fields 520-550 may include information, such as a string of numbers and/or letters, identifying the call type (e.g., local, inter-LATA long distance, intra-LATA long distance, international, etc.) and information identifying an address of a network device to which the corresponding call type should be forwarded. For example, in one implementation, each NAPTR record may include information identifying the associated gateway type (e.g., local, inter-LATA long distance, intra-LATA long distance). This information may be encoded in the NAPTR record using different ENUM service values for each gateway type or using a network specific assignment of values in the preference field of the NAPTR record. In an exemplary implementation, query logic 410 may access E.164 database 420 and retrieve information identifying all the associated NAPTR records for the various call types (i.e., the information stored in field 520-550), as described in more detail below.

Forwarding logic 430 may include logic for forwarding responses to queries to the appropriate devices. For example, forwarding logic 430 may return the NAPTR records associated with the call types for the called telephone number to S-CSCF-221, IBCF 250, a softswitch, etc. In each case, E.164 database 420 may be configured by a service provider associated with network 130 to store information identifying network addresses associated with elements to which various call types for calls that may be terminated to the PSTN should be forwarded. The querying device may then forward the call to the appropriate network device, as described in more detail below.

Figure 6:
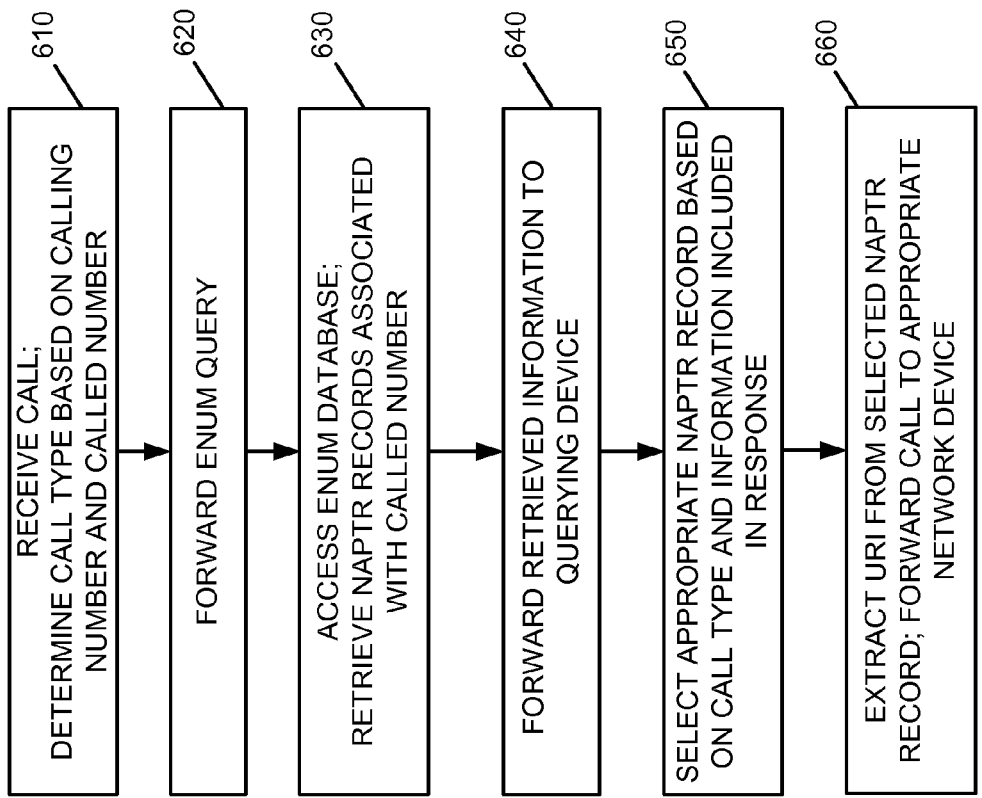
FIG. 6 is a flow diagram illustrating exemplary processing associated with the components of FIG. 2.

FIG. 6 is a flow diagram illustrating exemplary processing associated with network 100. Processing may begin with a call processing device receiving a call (act 610). For example, S-CSCF 221 may receive a call from user device 110 (FIG. 1) forwarded to P-CSCF 210 and S-CSCF 221 via network 130. S-CSCF 221 may forward the query to ENUM server 240. As an example, user device 110 (FIG. 1) may be a mobile telephone or VoIP telephone that is served by a service provider affiliated with network 130. In this example, assume that the call from user device 110 intended for user device 120 may be terminated via the PSTN.

The querying device (i.e., S-CSCF 221 in this example) may determine the call type associated with the received call (act 610). For example, S-CSCF 221 may identify the first six digits of the calling party telephone number (e.g., the NPA-NXX prefix) to identify a rate center associated with the calling party. S-CSCF 221 may also identify the first six digits of the called party telephone number to identify a rate center associated with the called party. If the rate centers are the same, S-CSCF 221 determines that the call is a local call. If, however, the rate centers are not the same, S-CSCF 221 may determine that the call is an inter-LATA long distance call or an intra-LATA long distance call based on whether the different rate centers are associated with the same LATA. Determining whether the call is an inter-LATA call or intra-LATA call may be performed by accessing a rate center table that identifies rate centers and corresponding LATAs/carriers. In addition, in situation where a country code is included with either the called or calling number, S-CSCF 221 may determine that the call is an international call.

In each case, S-CSCF 221 may identify the call type. S-CSCF 221 may also forward a query to ENUM server 240 (act 620). Query logic 410 may receive the query which includes the destination telephone number for the call. Query logic 410 may access E.164 database 420 to identify forwarding information for the call. In this example, and as described above with respect to FIG. 5, assume that E.164 database 420 stores information in fields 520-550 identifying call types and corresponding addresses of network devices associated with forwarding local calls, inter-LATA long distance calls, intra-LATA long distance calls and international calls that terminate to the PSTN. Query logic 410 may retrieve the NAPTR records associated with each of these call types for the called telephone number.

For example, query logic 410 may access E.164 database 420 to retrieve all the NAPTR records associated with the called telephone number (act 630). In an exemplary implementation, each NAPTR record may include information that identifies the gateway type (e.g., local, inter-LATA long distance). As discussed above, the gateway type may be encoded in the NAPTR record using, for example, different ENUM service values for each gateway type or a network-specific assignment of values in a preference field of the NAPTR record.

Forwarding logic 430 may then forward the retrieved information to the querying device (act 640). Continuing with this example in which the querying device is S-CSCF 221, forwarding logic 430 may forward the response to the query to S-CSCF 221.

The querying device (i.e., S-CSCF 221 in this example) may receive the information from ENUM server 240. S-CSCF 221 may then select the appropriate NAPTR record based on the identified call type (e.g., identified at act 610) and the gateway type information included in the response (act 650). As an example, if S-CSCF 221 determined that the incoming call was an inter-LATA long distance call, S-CSCF 221 may select the NAPTR record received in response to the ENUM query that includes information associated with an inter-LATA long distance call.

The querying device may extract a uniform resource identifier (URI) from the selected NAPTR record (act 660). The querying device may then forward the call/session request to the address identified by the URI (act 660). For example, continuing with the example above in which S-CSCF 221 determined that the call is an inter-LATA long distance call, S-SCSF 221 selects the NAPTR record associated with an inter-LATA long distance call, extracts the URI from the selected NAPTR record and forwards the call to the URI identified in the selected NAPTR record. If, however, S-CSCF 221 determines that the call is a local call, an intra-LATA long distance call or an international call, S-CSCF 221 may select the appropriate NAPTR record and forward the call to the network address of the device (e.g., gateway) configured to process that particular call type.

In this example, assume that network device 260 is configured by the service provider associated with network 140 to receive inter-LATA long distance calls that terminate to the PSTN. That is, the service provider/carrier associated with network 140 may have designated to the service provider associated with network 130 that network device 260 is the device (e.g., a gateway) that is configured to receive inter-LATA long distance calls from network 130 that terminate to the PSTN. In this case, the service provider associated with network 130 stored this address information and corresponding call type information in field 530 of E.164 database 420. As a result, S-CSCF 221 may forward the call to network device 260.

In this manner, calls that terminate to the PSTN are forwarded to the appropriate network device without any intermediate processing. That is, ENUM server provides information identifying all of the network devices in network 140 that are configured to receive calls that terminate to the PSTN. Logic included in the querying device (e.g., S-CSCF 221, IBCF 250, a softswitch, etc.) may then identify the call type and forward the call directly to the designated device. This simplifies processing associated with the service provider of network 130. That is, calls from within network 130 are forwarded from a VoIP system to a PSTN element configured to serve the call in a manner that reduces signaling within a service provider's network.

Implementations described herein provide a telephone number mapping database that includes information identifying a number of different network devices configured to process calls that terminate in another network, such as the PSTN. When a query is made to the telephone number mapping database, call type information and network address information may be provided to the querying device. The querying device may then forward the call to the appropriate device, thereby providing very efficient processing of calls by the service provider that received the call.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, in the implementations described above, an ENUM server was described as performing the lookup to an ENUM database and providing address information associated with a number of different network devices. In other implementations, the ENUM server may be provided with information regarding the call type and select the address information corresponding to the call type. For example, the querying device (e.g., S-CSCF 221, IBCF 250, a softswitch, etc.) may provide information to ENUM server 240 identifying the call type. In this case, ENUM server 240 may return the address information with only the appropriate network device configured to handle that call type.

In addition, features have been described above with respect to an ENUM server forwarding replies to querying devices that include NAPTR records associated with various network elements. In other implementations, other address identifying information (e.g., uniform resource identifiers) may be provided to querying devices. Still further, implementations described above refer to networks 130 and 140 being associated with different service providers. In other implementations, networks 130 and 140 may represent different entities, such as different sub-networks within a single service provider's network.

In addition, while series of acts have been described with respect to FIG. 6, the order of the acts may be varied in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
receiving a telephone number mapping query from a querying device, the telephone number mapping query being associated with a call from a calling party to a called party;
retrieving a plurality of naming authority pointer (NAPTR) records based on the telephone number mapping query, wherein each of the plurality of NAPTR records includes address information identifying an address associated with a network device and call type information associated with the identified address; and
forwarding the plurality of NAPTR records to the querying device.

2. The method of claim 1, wherein the call type information corresponds to at least one of a local call, an inter-local access and transport area (LATA) long distance call, an intra-LATA long distance call or an international call.

3. The method of claim 2, further comprising:
determining, by the querying device, whether the call is at least one of a local call, an inter-LATA long distance call, an intra-LATA long distance call, or an international call terminating to a public switched telephone network.

4. The method of claim 3, further comprising:
determining, by the querying device, a call type associated with the call from the calling party to the called party;
selecting one of the plurality of NAPTR records based on the determined call type;
identifying, by the querying device, an address associated with a first network device based on the selected NAPTR record; and
forwarding the call to the first network device.

5. The method of claim 3, wherein the querying device comprises a call session control function component, a session border control component or a softswitch.

6. The method of claim 1, wherein the retrieving a plurality of NAPTR records comprises:
accessing an E.164 number mapping (ENUM) database to identify the plurality of NAPTR records.

7. The method of claim 6, further comprising:
storing, in the ENUM database, information identifying network devices configured to receive calls that terminate to a public switched telephone network.

8. The method of claim 6, wherein
each of the NAPTR records is associated with one of a local call type or a long distance call type.

9. The method of claim 8, wherein the plurality of NAPTR records comprise a NAPTR record for a local call, a NAPTR record for an inter-LATA long distance call and a NAPTR record for an intra-LATA long distance call, and wherein each NAPTR record includes information identifying whether the NAPTR record is associated with a local call, an inter-LATA long distance call or an intra-LATA long distance call.

10. A system comprising:
a database configured to store telephone number mapping information; and
logic configured to:
receive a telephone number mapping query from a querying device, the telephone number mapping query being associated with a call from a calling party to a called party,
retrieve, from the database, a plurality of records based on the telephone number mapping query, wherein each of the plurality of records includes address information and call type information, the address information identifying an address associated with a network device and wherein each address corresponds to a different call type, and
forward the plurality of records to the querying device.

11. The system of claim 10, wherein the database includes information identifying addresses of network devices configured to receive calls that terminate to a public switched telephone network.

12. The system of claim 10, wherein the plurality of records correspond to naming authority pointer (NAPTR) records and the database includes NAPTR records for a plurality of different call types.

13. The system of claim 12, wherein the plurality of different call types comprises a local call type, an inter-LATA long distance call type and an intra-LATA long distance call type.

14. The system of claim 12, further comprising:
a plurality of call session control function (CSCF) components; and
a plurality of border control function (BCF) components, wherein when receiving a telephone number mapping query, the logic is configured to:
receive the query from one of the CSCF components or one of the BCF components.

15. A device, comprising:
a communication interface; and
logic configured to:
forward a query to a telephone number mapping device, the query being associated with a call from a calling party to a called party,
receive, via the communication interface, address information from the telephone number mapping device, the address information comprising a plurality of addresses identifying a plurality of network devices,
receive, via the communication interface, call type information from the telephone number mapping device, the call type information identifying a call type associated with each of the plurality of addresses,
identify a call type associated with the call from the calling party to the called party, select a first one of the plurality of network devices based on the identified call type, and forward the call to the first network device.

16. The device of claim 15, wherein when identifying a call type, the logic is configured to compare a first number of digits associated with a telephone number of the calling party to the first number of digits associated with a telephone number of the called party.

17. The device of claim 15, wherein when identifying a call type, the logic is configured to:

identify at least one of a local call, an inter local access and transport area (LATA) long distance call, or an intra-LATA long distance call.

18. The device of claim 17, wherein the logic is further configured to:

select a different one of the network devices for local calls, inter-LATA long distance calls and intra-LATA long distances, and forward calls that terminate in a public switched telephone network to the selected network device.

19. The device of claim 15, wherein the device comprises a call session control component, a border control component or a softswitch.

\* \* \* \* \*